United States Patent
Kumar

(10) Patent No.: US 11,375,461 B1
(45) Date of Patent: Jun. 28, 2022

(54) USER EQUIPMENT (UE) TRANSMIT POWER CONTROL FOR DUAL SUBSCRIPTION DUAL ACTIVE (DSDA) OPERATIONS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/219,636

(22) Filed: Mar. 31, 2021

(51) Int. Cl.
  *H04W 52/36* (2009.01)
  *H04L 5/14* (2006.01)
  *H04W 4/80* (2018.01)
  *H04W 52/28* (2009.01)

(52) U.S. Cl.
  CPC ............. *H04W 52/367* (2013.01); *H04L 5/14* (2013.01); *H04W 4/80* (2018.02); *H04W 52/281* (2013.01)

(58) Field of Classification Search
  CPC ... H04W 52/367; H04W 4/80; H04W 52/281; H04L 5/14
  See application file for complete search history.

(56) References Cited

U.S. PATENT DOCUMENTS

| | | | | |
|---|---|---|---|---|
| 9,820,091 | B1* | 11/2017 | Kumar | H04W 4/02 |
| 10,623,946 | B1* | 4/2020 | Kumar | H04W 76/27 |
| 2015/0031408 | A1* | 1/2015 | Kalla | H04W 52/38 |
| | | | | 455/522 |
| 2015/0304963 | A1* | 10/2015 | Mitra | H04W 52/367 |
| | | | | 455/78 |
| 2018/0270838 | A1* | 9/2018 | Maheshwari | H04W 52/346 |
| 2019/0215783 | A1* | 7/2019 | Chakraborty | H04W 52/34 |
| 2019/0364492 | A1* | 11/2019 | Azizi | H04W 48/16 |
| 2020/0022086 | A1* | 1/2020 | Yu | H04W 52/34 |

* cited by examiner

*Primary Examiner* — David Bilodeau
(74) *Attorney, Agent, or Firm* — Loza & Loza LLP

(57) ABSTRACT

Aspects of the disclosure relate to a method of wireless communication at a user equipment (UE), including determining that future or past simultaneous first and second signal transmissions by first and second transceivers pursuant to a dual subscription dual active (DSDA) mode of operation may exceed or has exceeded a maximum allowed transmit power, respectively; and performing at least one operation to reduce an occurrence, likelihood or frequency of the future simultaneous first and second signal transmissions exceeding the maximum allowed transmit power in the DSDA mode of operation, respectively.

26 Claims, 12 Drawing Sheets

USER EQUIPMENT (UE) TRANSMIT POWER CONTROL FOR DUAL SUBSCRIPTION DUAL ACTIVE (DSDA) OPERATIONS

TECHNICAL FIELD

The technology discussed below relates generally to wireless communication networks, and more particularly, to transmit power control for a user equipment (UE) while operating under dual subscription dual active (DSDA) mode.

INTRODUCTION

A user equipment (UE) may be designated to be in a particular power class where its transmit power is limited to a maximum allowed transmit power to prevent radiation harm to humans, and protect its components from excess power consumption and heat dissipation. If the UE is configured with a single transceiver for single uplink operation, the transmit power of the UE may be easily controlled to meet the power class requirements. However, if the UE is configured with multiple transceivers, as in the case of multiple subscriber identification modules (MSIMs) and dual subscription dual active (DSDA) modes of operation, the transmit power control may not be straightforward.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

An aspect of the disclosure relates to a method of wireless communication at a user equipment (UE) is disclosed. The method includes determining that future or past simultaneous first and second signal transmissions by first and second transceivers pursuant to a dual subscription dual active (DSDA) mode of operation may exceed or has exceeded a maximum allowed transmit power, respectively; and performing at least one operation to reduce an occurrence, likelihood or frequency of the future simultaneous first and second signal transmissions exceeding the maximum allowed transmit power in the DSDA mode of operation, respectively.

Another aspect of the disclosure relates to a user equipment (UE) including a first transceiver; a second transceiver; a memory; and a processor communicatively coupled to the first and second transceivers and the memory, wherein the processor and the memory are configured to: determine that future or past simultaneous first and second signal transmissions by the first and second transceivers pursuant to a dual subscription dual active (DSDA) mode of operation may exceed or has exceeded a maximum allowed transmit power, respectively; and perform at least one operation to reduce an occurrence, likelihood or frequency of the future simultaneous first and second signal transmissions exceeding the maximum allowed transmit power in the DSDA mode of operation, respectively.

Another aspect of the disclosure relates to a user equipment (UE) including means for determining that future or past simultaneous first and second signal transmissions by the first and second transceivers pursuant to a dual subscription dual active (DSDA) mode of operation may exceed or has exceeded a maximum allowed transmit power, respectively; and means for performing at least one operation to reduce an occurrence, likelihood or frequency of the future simultaneous first and second signal transmissions exceeding the maximum allowed transmit power in the DSDA mode of operation, respectively.

Another aspect of the disclosure relates to a non-transitory computer-readable medium storing computer-executable code, comprising code for causing a computer in a user equipment (UE) to: determine that future or past simultaneous first and second signal transmissions by first and second transceivers pursuant to a dual subscription dual active (DSDA) mode of operation may exceed or has exceeded a maximum allowed transmit power, respectively; and perform at least one operation to reduce an occurrence, likelihood or frequency of the future simultaneous first and second signal transmissions exceeding the maximum allowed transmit power in the DSDA mode of operation, respectively.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
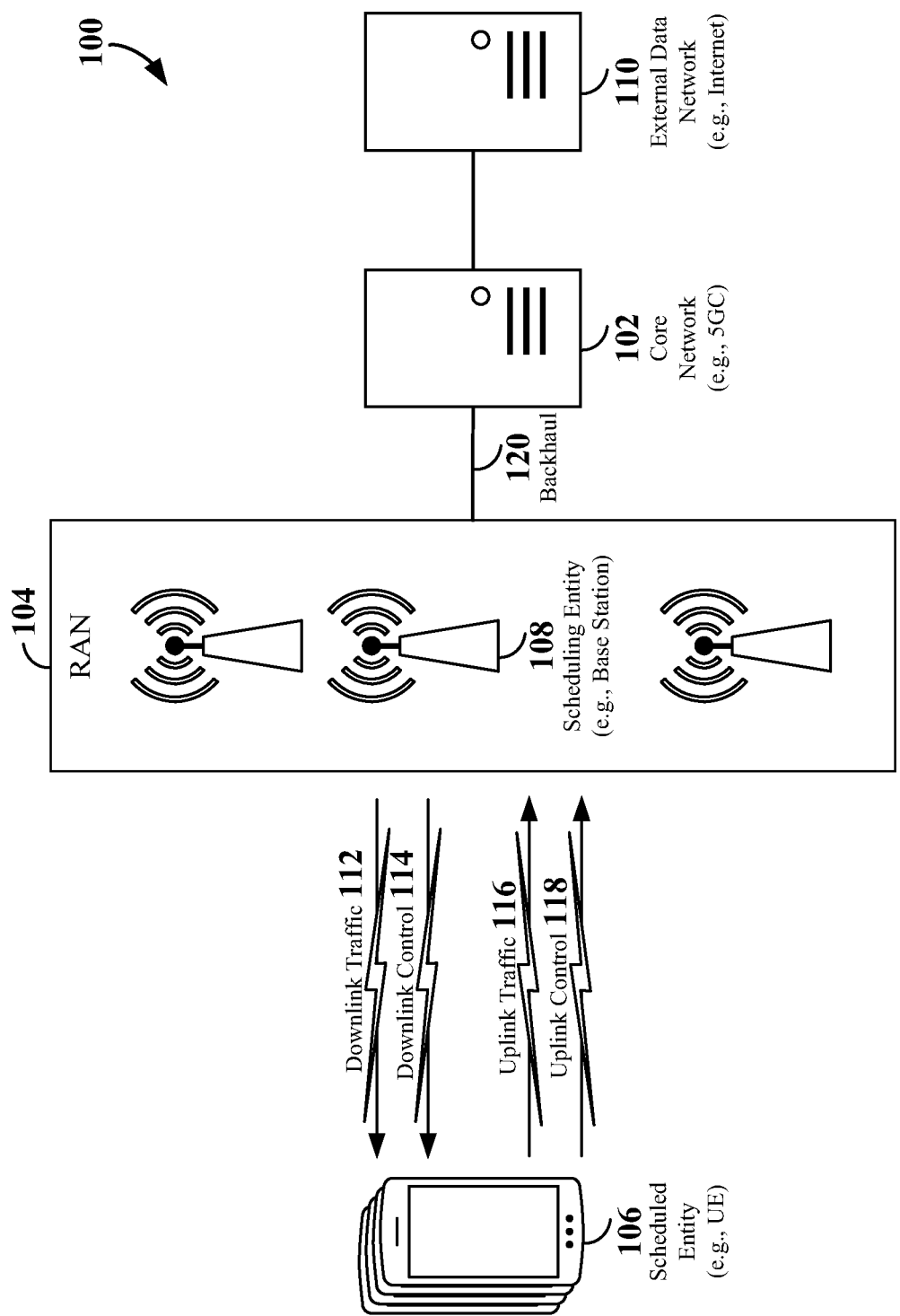
FIG. 1 is a schematic illustration of a wireless communication system in accordance with an aspect of the disclosure.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated.

Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things". A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
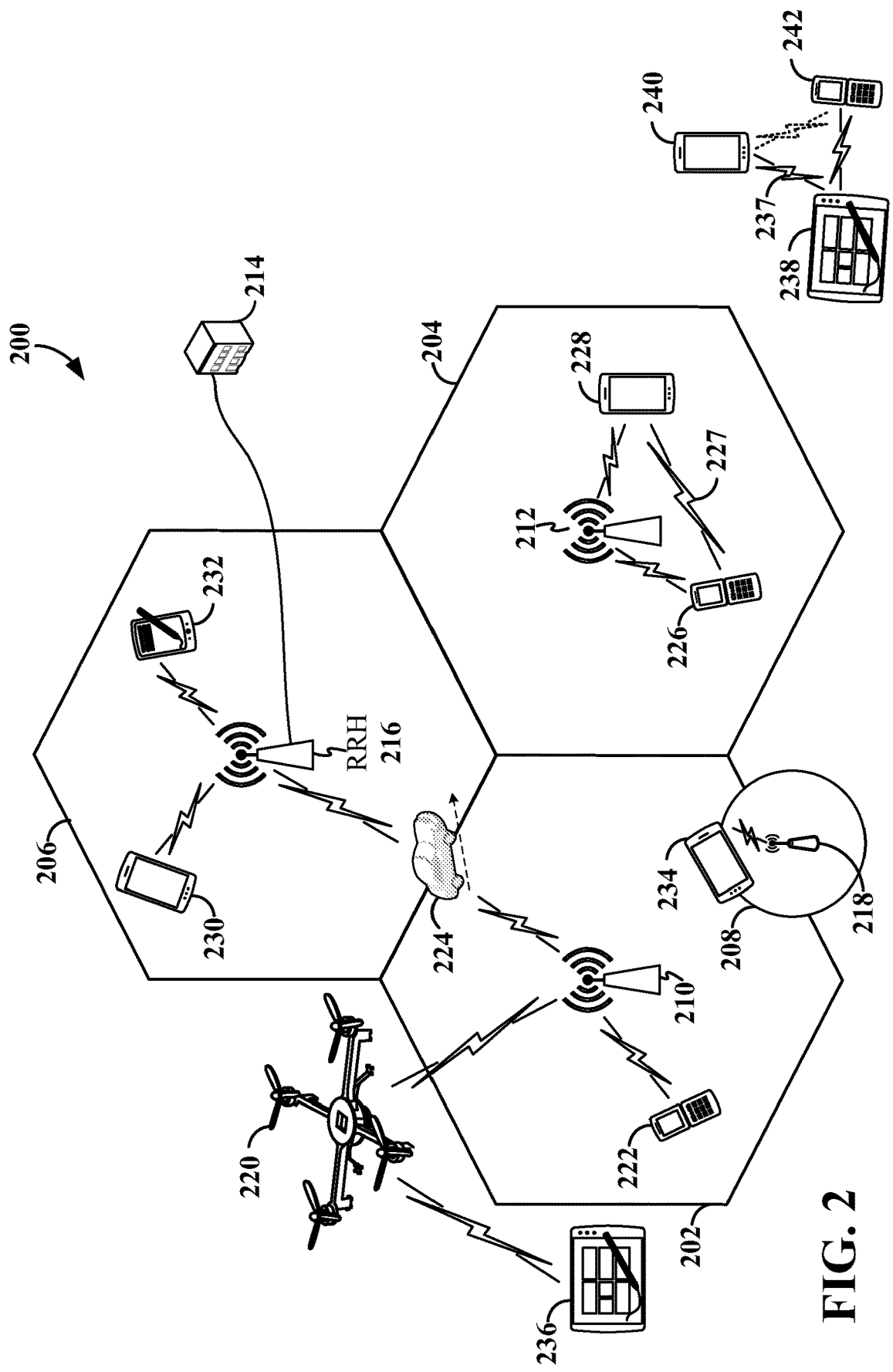
FIG. 2 is a conceptual illustration of an example of a radio access network in accordance with another aspect of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, where a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at sometimes the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
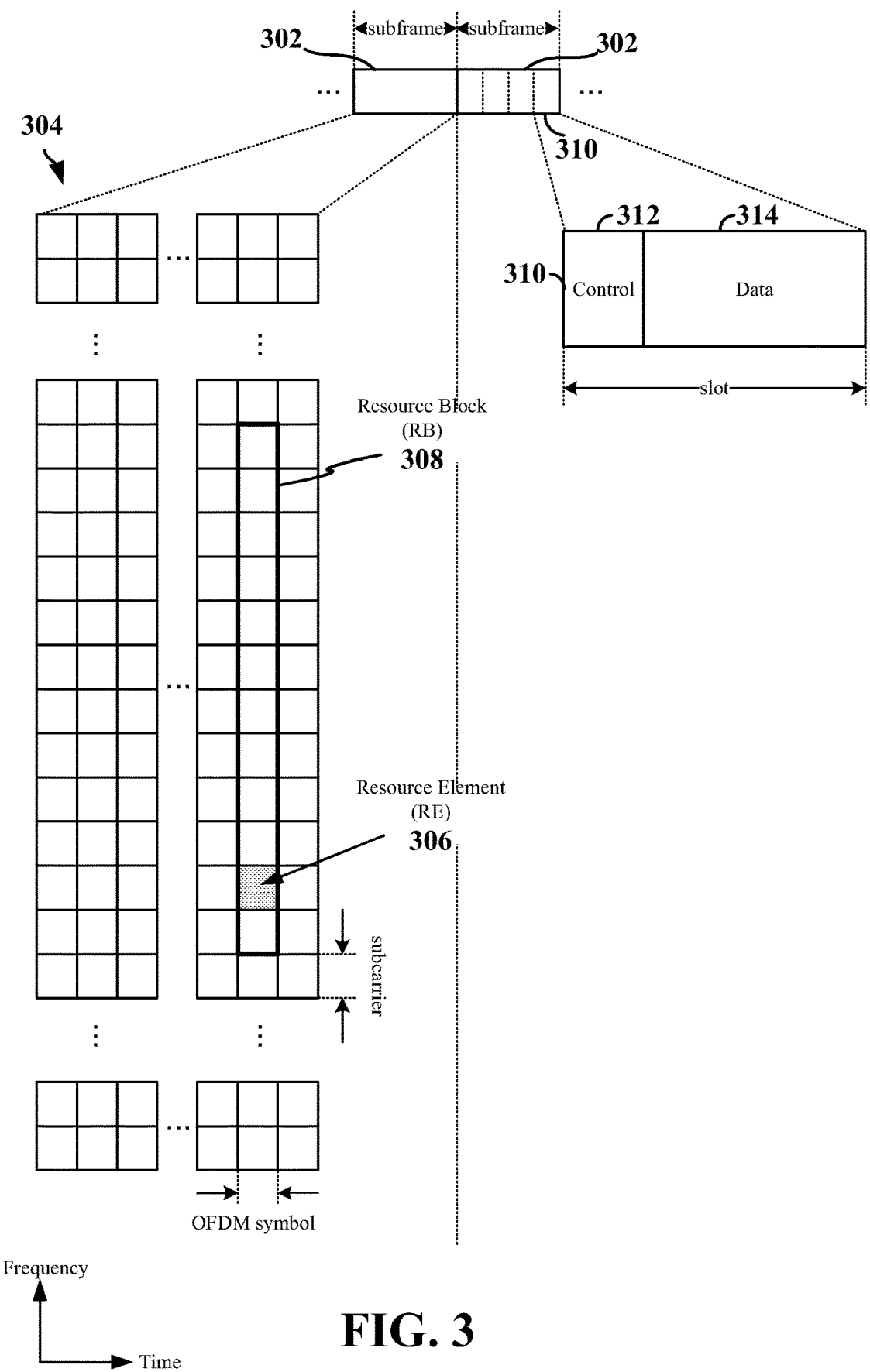
FIG. 3 is a schematic diagram illustrating organization of wireless resources in an air interface utilizing orthogonal frequency divisional multiplexing (OFDM) in accordance with another aspect of the disclosure.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each one (1) millisecond (ms) subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In order to gain access to a cell, a UE may perform a random access procedure over a physical random access channel (PRACH). The UE may identify a random access search space including PRACH resources for initiating a RACH procedure from the SIB1. For example, a random access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

Figure 4A:
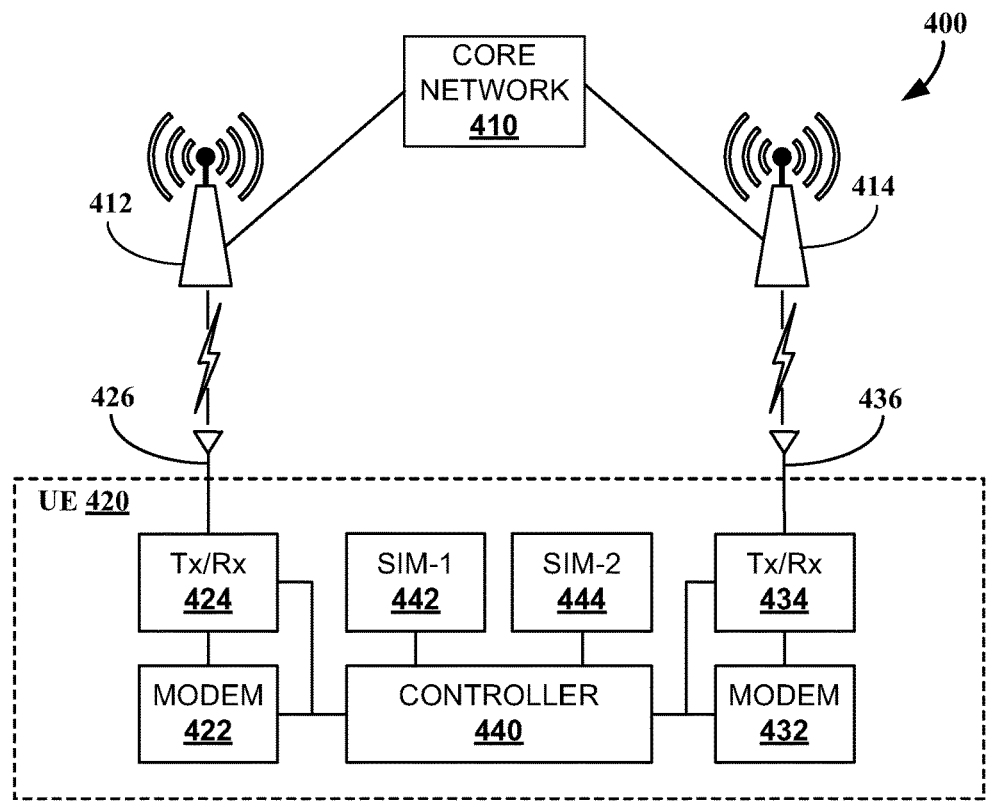
FIGS. 4A-4B are diagrams illustrating example wireless communication systems in accordance with other aspects of the disclosure.

FIG. 4A is a diagram illustrating an example wireless communication system 400 in accordance with another aspect of the disclosure. The wireless communication system 400 includes a first base station 412, a second base station 414, a core network 410, and a user equipment (UE) 420.

The first and second base stations 412 and 414 are communicatively coupled to the core network 410, which could be by a wired and/or wireless connection. As an example, the base stations 412 and 414 and the core network 410 may be in a non-standalone (NSA) configuration, where the first base station 412 may be an LTE base station, the second base station 414 may be a 5G NR base station, and the core network 410 may be a 4G core network. In another example, the base stations 412 and 414 and the core network 410 may be in a standalone (SA) configuration, where both the first and second base stations 412 and 414 may be 5G NR base stations, and the core network 410 may be a 6G core network. It shall be understood that the configuration of the base stations 412 and 414, and core network 410 may vary significantly, and need not be limited to the aforementioned examples.

In this example, the UE 420 may be configured for multiple subscriber identity module (MSIM) and dual subscription dual active (DSDA) modes of operations. The MSIM mode of operation means that the UE 420 may communicate with the two different base stations 412 and 414 based on two SIM cards SIM-1 442 and SIM-2 444, respectively. The DSDA mode of operation means that the UE 420 may simultaneously communicate with the two base stations 412 and 414 based on the two SIM cards SIM-1 442 and SIM-2 444, respectively. Although two sim card operations is used to exemplify the concepts herein, it shall be understood that the UE 420 may perform more than two sim card operations in MSIM-DSDA modes of operation.

In this regard, the UE 420 includes a first antenna 426, a first transceiver (Tx/Rx) 424, a first modem 422, a first SIM-1 card 442 (with reader), a controller 440, a second SIM-2 card 444 (with reader), a second modem 432, a second transceiver (Tx/Rx) 434, and a second antenna 436. It shall be understood that each of the first and second antennas 426 and 436 may be configured as an antenna array including a set of antenna elements. In MSIM mode, the UE 420 may communicate with the first base station 412 based on the first SIM-1 card 442. That is, the controller 440 reads the information stored in the first SIM-1 card 442, and configures/controls the modem 442 and transceiver 424 to wirelessly communicate with the first base station 412 via the antenna 426. Similarly, the UE 420 may communicate with the second base station 414 based on the second SIM-2 card 444. That is, the controller 440 reads the information stored in the second SIM-2 card 444, and configures/controls the modem 432 and transceiver 434 to wirelessly communicate with the second base station 414 via the antenna 436. The communications with two different base stations are sometimes referred to as dual connectivity mode, and there are various different configurations of dual connectivity mode.

Because the UE 420 has two modems, two transceivers, and two antennas 422/424/426 and 432/434/436, the UE 420 is able to simultaneously communicate with the first and second base stations 412 and 414 in the DSDA mode of operation, respectively. As examples, the UE 420 may simultaneously communicate data with the first and second base stations 412 and 414 (e.g., sometimes referred to as Data+Data DSDA). The UE 420 may simultaneously communicate data and voice with the first and second base stations 412 and 414 (or vice-versa), respectively, (e.g., sometimes referred to as Data+Voice DSDA). The UE 420 may simultaneously support voice calls via the first and second base stations 412 and 414, respectively, (e.g., sometimes referred to as Voice+Voice Hold DSDA).

If the UE 420 is part of a vehicle entertainment system, the UE 420 may simultaneously communicate traffic control and collision avoidance data (sometimes referred to as cellular-vehicle-to-X (C-V2X), where X represents traffic infrastructure, other vehicles, and/or pedestrians) and data or voice with the first and second base stations 412 and 414 (or vice-versa), respectively, (e.g., sometimes referred to as C-V2X+Data or C-V2X+Voice DSDA). In this regard, the vehicle may have its own SIM card (sometimes referred to as an original equipment manufacturer (OEM) SIM card), and may include a slot to receive a user's or vehicle occupant's SIM card.

Figure 4B:
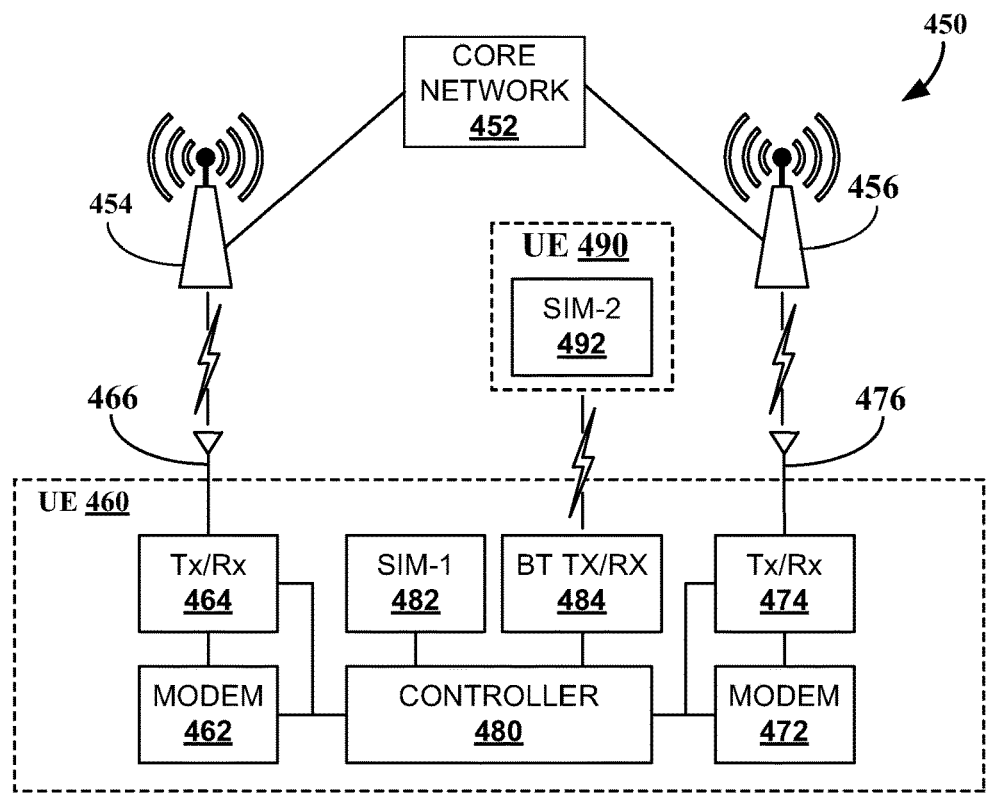

FIG. 4B is a diagram illustrating another example wireless communication system 450 in accordance with another aspect of the disclosure. The wireless communication system 450 is similar to wireless communication system 400, and includes many of the same or similar elements, such as a first base station 454, a second base station 456, a core network 452, and a user equipment (UE) 460. The UE 460 similarly includes a first modem 462, a first transceiver 464, a first antenna 466, a first SIM-1 card 482 (with reader), a controller 480, a second modem 472, a second transceiver 474, and a second antenna 476. The details of these same or similar elements have been discussed with reference to wireless communication system 400.

The UE 460 differs from UE 420 in that instead of having a second SIM card reader (although it may still be implemented to directly read a second SIM card), the UE 460 includes a Bluetooth (BT) transceiver (Tx/Rx) 484 configured to communicate with a user equipment (UE) 490 to receive information from a second SIM-2 card 492 in the UE 490. Thus, the controller 480 reads the information stored in the second SIM-2 card 492 of UE 490 via Bluetooth communications using its Bluetooth transceiver 484, and configures/controls the modem 472 and transceiver 474 to wirelessly communicate with the second base station 456 via the antenna 476. This may be a situation where the UE 460 is part of a vehicle system, and the UE 490 is a device used by an occupant of the vehicle.

Figure 5A:
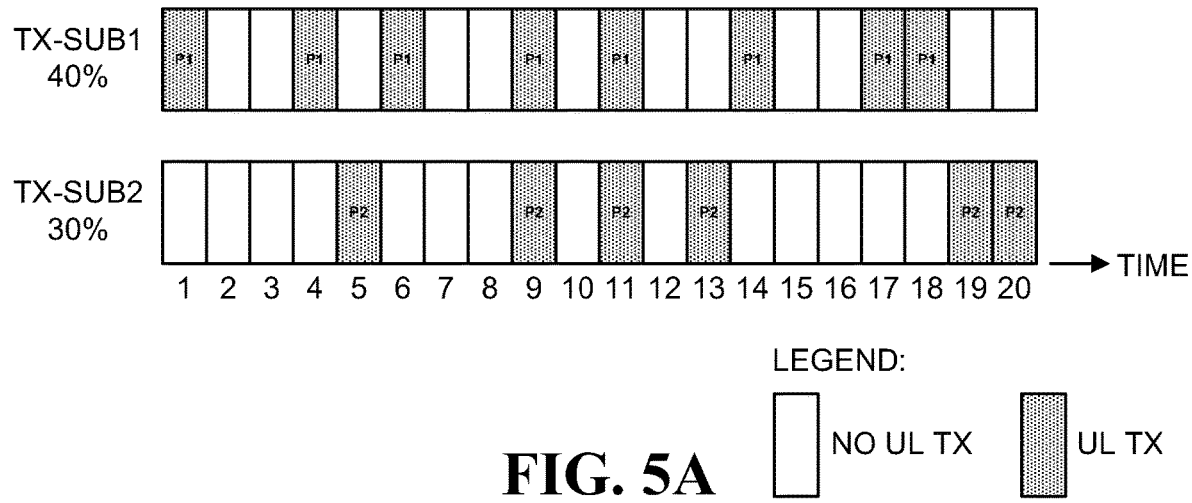
FIG. 5A is a timing diagram of example uplink transmission slots pertaining to a dual subscription dual active (DSDA) mode of operation in accordance with another aspect of the disclosure.

FIG. 5A is a timing diagram of example uplink transmission slots pursuant to a dual subscription dual active (DSDA) mode of operation of UE 420 or 460 in accordance with another aspect of the disclosure. The x- or horizontal axis represents time, and it is divided into 20 uplink transmission slots numbered 1-20 represented as rectangles.

The upper rectangles represent the uplink transmission slots associated with the first SIM-1 card 442 or 482 of UE 420 or 460, respectively, (e.g., by using the first modem 422 or 462, first transceiver 424 or 464, and first antenna 426 or 466 of UE 420 or 460, respectively). The lower rectangles represent the uplink transmission slots associated with the second SIM-2 card 444 or 492 of UE 420 or 490, respectively, (e.g., by using the second modem 432 or 472, second transceiver 434 or 474, and second antenna 436 or 476 of UE 420 or 460, respectively). In this example, the uplink transmission slots associated with the first and second SIM-1 and SIM-2 cards or subscriptions are synchronous (time-aligned), but need not be in all implementations described herein.

As the legend in FIG. 5A indicates, the light rectangles indicate uplink transmission slots in which no uplink signal is transmitted, and the darkened rectangles indicate uplink transmission lots in which an uplink signal is transmitted. For example, with respect to the first SIM-1 card or subscription, uplink signals are transmitted in slots 1, 4, 6, 9, 11, 14, 17, and 18. As there area total of 20 uplink transmission slots shown, and eight (8) uplink signal transmissions occurred in the time interval of 20 uplink transmission slots, it may be said that the transmission rate associated with the first SIM-1 card is 40 percent (e.g., 8/20*100%). The P1 inside the darkened rectangles indicates the power level of the uplink signal transmitted in those slots.

Similarly, with respect to the second SIM-2 card or subscription, uplink signals are transmitted in slots 5, 9, 11, 13, 19, and 20. Again, as there are a total of 20 uplink transmission slots shown, and six (6) uplink signal transmissions occurred in the time interval of 20 uplink transmission slots, it may be said that the transmission rate associated with the second SIM-2 card is 30 percent (e.g., 6/20*100%). The P2 inside the darkened rectangles indicates the power level of the uplink signal transmitted in those slots.

A user equipment (UE), such as UE 420 and 460, may pertain to a power class, where a maximum allowed transmit power may be specified. That is, to prevent unsafe human exposure to electromagnetic radiation and prevent excessive power consumption and heat dissipation in the device, the power level of the signal transmitted by a UE should not exceed the maximum allowed transmit power at any given time. As an example, a UE with a power class 3 has a maximum allowed transmit power of 23 decibel-milliwatts (dBm). A UE with a power class 2 has a maximum allowed transmit power of 26 dBm.

In single transceiver user equipment (UE), a transmit power controller may control the power level of the signal transmitted by the transceiver, which may also be specified by the corresponding base station or cell to which the signal is being transmitted. However, when a UE has two transceivers, and is operating in DSDA mode, the sum of the power levels of the signals simultaneously transmitted by the transceivers should be considered with respect to the maximum allowed transmit power. In other words, the sum of the power levels of the signals simultaneously transmitted by the transceivers should not exceed the maximum allowed transmit power, otherwise there is a conformance violation of the power class.

With reference again to the uplink transmission slot timing diagram of FIG. 5A, there are a couple of uplink transmission slots where both transceivers 424/434 or 464/474 of the UE 420 or 460 simultaneously transmits uplink signals. These slots are slots 9 and 11. As the first transceiver 424/464 associated with the first SIM-1 card transmits the uplink signal at a power level of P1, and the second transceiver 434/474 associated with the second SIM-2 card transmits the uplink signal at a power level of P2, the sum of the power levels P1 and P2 during uplink transmission slots 9 and 11 should not exceed the maximum allowed transmit power.

Figure 5B:
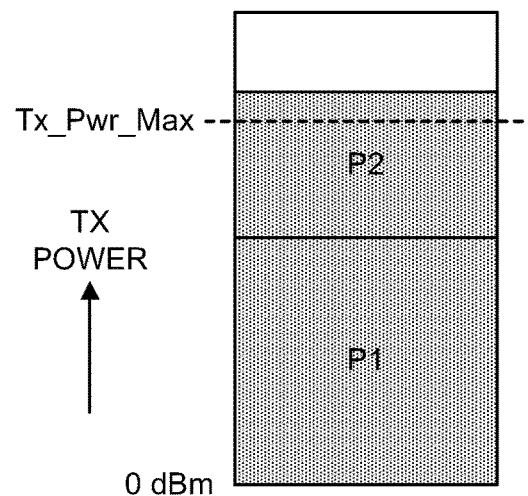
FIG. 5B is a transmission power level diagram pertaining to the example dual subscription dual active (DSDA) mode of operation of FIG. 5A in accordance with another aspect of the disclosure.

FIG. 5B is a transmission power level diagram pertaining to the example dual subscription dual active (DSDA) mode of operation of FIG. 5A in accordance with another aspect of the disclosure. The power level diagram may pertain to an uplink transmission slot where both transceivers 424/434 or 464/474 simultaneously transmits uplink signals, as in slots 9 and 11 shown in FIG. 5A. The vertical axis of the power level diagram represents transmit power. A horizontal dashed line represents the maximum allowed transmit power Tx_Pwr_Max for the power class of the UE 420 or 460.

As illustrated, the power level P1 of the uplink signal transmitted by the first transceiver 424/464 may occupy a significant portion of the power allotment specified by the maximum allowed transmit power Tx_Pwr_Max, and the power level P2 of the uplink signal transmitted by the second transceiver 434/474 may occupy another significant portion of the power allotment specified by the maximum allowed transmit power Tx_Pwr_Max. In this example, the sum of the power levels P1 and P2 exceed the maximum allowed transmit power Tx_Pwr_Max. Thus, if the transmit power of the first and second transceivers 424/464 or 434/474 are independently controlled, there may be a high probability or likelihood that the signal power transmitted by the UE 420 or 460 may exceed the maximum allowed transmit power Tx_Pwr_Max.

Figure 6A:
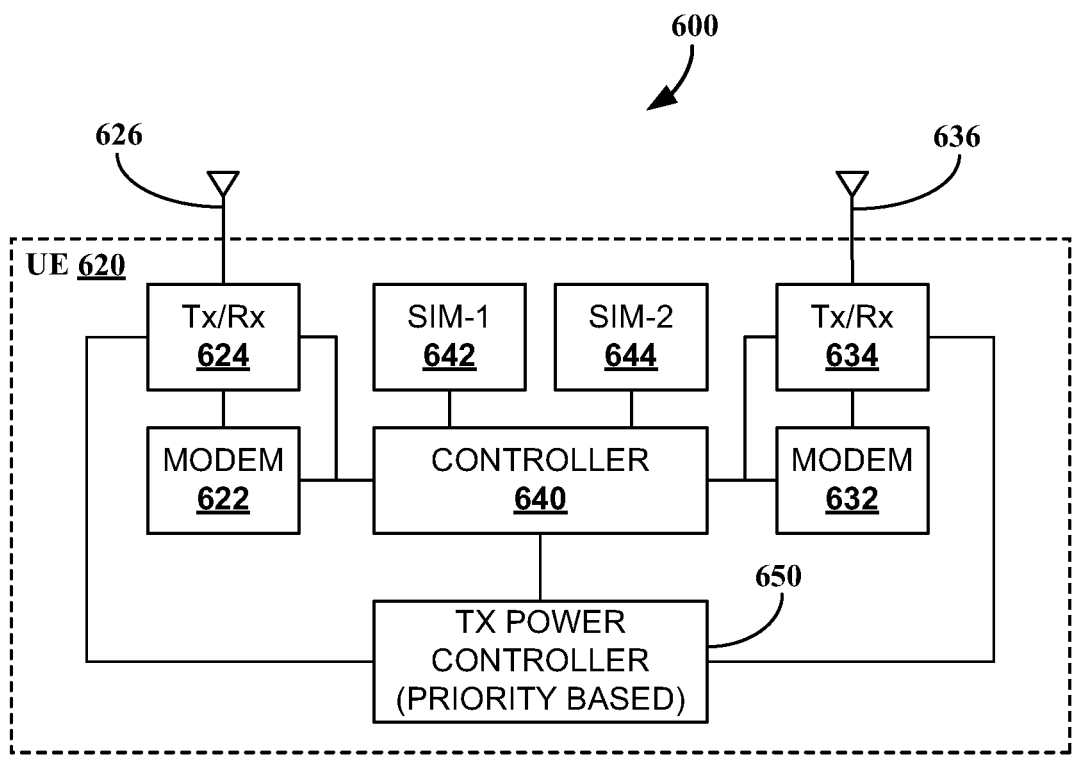
FIG. 6A is a block diagram of example user equipment (UE) capable of dual subscription dual active (DSDA) mode of operation in accordance with another aspect of the disclosure.

FIG. 6A is a block diagram of an example user equipment (UE) 600 in accordance with another aspect of the disclosure. In summary, the UE 600 may be configured similar to UE 420 or 460, including a first modem 622, a first transceiver (Tx/Rx) 624, a first antenna 626, a first SIM-1 card 642 (with reader), a controller 640, a second SIM-2 card 644 (with reader or located in another device per UE 460 previously discussed), a second modem 632, a second transceiver (Tx/Rx) 634, and a second antenna 636.

So that the sum of the power levels of the uplink signal simultaneously transmitted by the first and second transceivers 624 and 634 pursuant to a DSDA mode of operation does not exceed the maximum allowed transmit power, the UE 620 includes a transmit power controller 650 that adjusts the power level of one or more of the uplink signals simultaneously transmitted. In this example, the transmit power controller 650 adjusts the power level of the signal associated with a lower priority application. The transmit power controller 650 may be coupled to the controller 640 and the first and second transceivers 624 and 634.

For example, the controller 640 may set the specified power levels of the uplink signal transmitted by transceivers 624 and 634 as P1 and P2, respectively. Accordingly, if the uplink signals transmitted by the transceivers 624 and 634 do not occur simultaneously (e.g., in different uplink transmission slots), the transceivers 624 and 634 transmit the uplink signals at the specified power levels P1 and P2, either of which do not exceed the maximum allowed transmit power Tx_Pwr_Max. However, if the transmit power controller 650 determine that during one or more future or past uplink transmission slots, the transceivers 624 and 634 will be operated or have operated to simultaneously transmit uplink signals, the transmit power controller 650 adjusts the power level P1 and/or P2 such that the sum of the adjusted power levels P1' and/or P2' does not exceed maximum allowed transmit power Tx_Pwr_Max.

In this example, the transmit power controller 650 adjusts the specified power level of the signal associated with the lower priority application. Or, the transmit power controller 650 does not adjust the specified power level P1 of the signal associated with the higher priority application, and adjusts the specified power level P2' of the lower priority application.

As an example, if the uplink signal transmitted by the first transceiver 624 is associated with an emergency application (e.g., dialing 911 or other emergency number) and the uplink signal simultaneously transmitted by the second transceiver 634 is associated with Internet data, the transmit power controller 650 maintains the power level of the uplink emergency signal transmitted by the first transceiver 624 at the specified power level P1 indicated by the controller 640, and lowers the power level of the uplink signal transmitted by the second transceiver to P2'; where the sum of the power levels P1 and P2' does not exceed the maximum allowed transmit power. Accordingly, in this example, emergency transmissions are given higher priority over others, such as C-V2X, voice, and data.

Considering another example, if the uplink signal transmitted by the first transceiver 624 is associated with a vehicle C-V2X application and the uplink signal simultaneously transmitted by the second transceiver 634 is associated with Internet data or voice, the transmit power controller 650 maintains the power level of the uplink signal transmitted by the first transceiver 624 at the specified power level P1 indicated by the controller 640, and lowers the power level of the uplink signal transmitted by the second transceiver to P2'; where the sum of the power levels P1 and P2' does not exceed the maximum allowed transmit power. Accordingly, in this example, C-V2X transmissions are given higher priority over voice and data.

Considering yet another example, if the uplink signal transmitted by the first transceiver 624 is associated with a vehicle SIM card and the uplink signal simultaneously transmitted by the second transceiver 634 is associated with a SIM card of a user device of the vehicle's occupant, the transmit power controller 650 maintains the power level of the uplink signal transmitted by the first transceiver 624 at the specified power level P1 indicated by the controller 640, and lowers the power level of the uplink vehicle occupant user device signal transmitted by the second transceiver to P2'; where the sum of the power levels P1 and P2' does not exceed the maximum allowed transmit power. Accordingly, in this example, the vehicle's SIM card transmissions are given higher priority over a user's SIM card transmissions.

Considering still another example, if the uplink signal transmitted by the first transceiver 624 is associated with a voice call and the uplink signal simultaneously transmitted by the second transceiver 634 is associated with data, the transmit power controller 650 maintains the power level of the uplink signal transmitted by the first transceiver 624 at the specified power level P1 indicated by the controller 640, and lowers the power level of the uplink signal transmitted by the second transceiver to P2'; where the sum of the power levels P1 and P2' does not exceed the maximum allowed transmit power. Accordingly, in this example, voice transmissions are given higher priority over data transmissions.

Figure 6B:
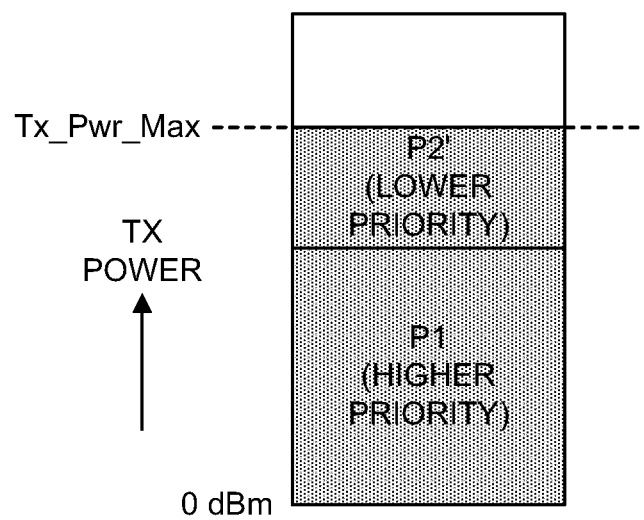
FIG. 6B is a transmission power level diagram pertaining to an example dual subscription dual active (DSDA) mode of operation of the UE of FIG. 6A in accordance with another aspect of the disclosure.

FIG. 6B is a transmission power level diagram pertaining to the example dual subscription dual active (DSDA) mode of operation of the UE 600 in accordance with another aspect of the disclosure. The power level diagram is similar to the power level diagram of FIG. 5A, with the exception that the power level of the signal transmitted by the second transceiver 634 (during an uplink transmission slot in which the first transceiver 624 also transmits an uplink signal with the specified power level P1), the transmit power controller 650 lowers its specified power level from P2 to P2' so that the sum of the power levels P1 and P2' does not exceed the maximum allowed transmit power Tx_Pwr_Max. Thus, the transmit power controller 650 ensures that the maximum allowed transmit power specification or the power class conformance is not violated. As mentioned, the signal transmitted by the first transceiver 624 may be associated with an application designated as having higher priority than an application associated with the signal transmitted by the second transceiver 634.

Figure 7A:
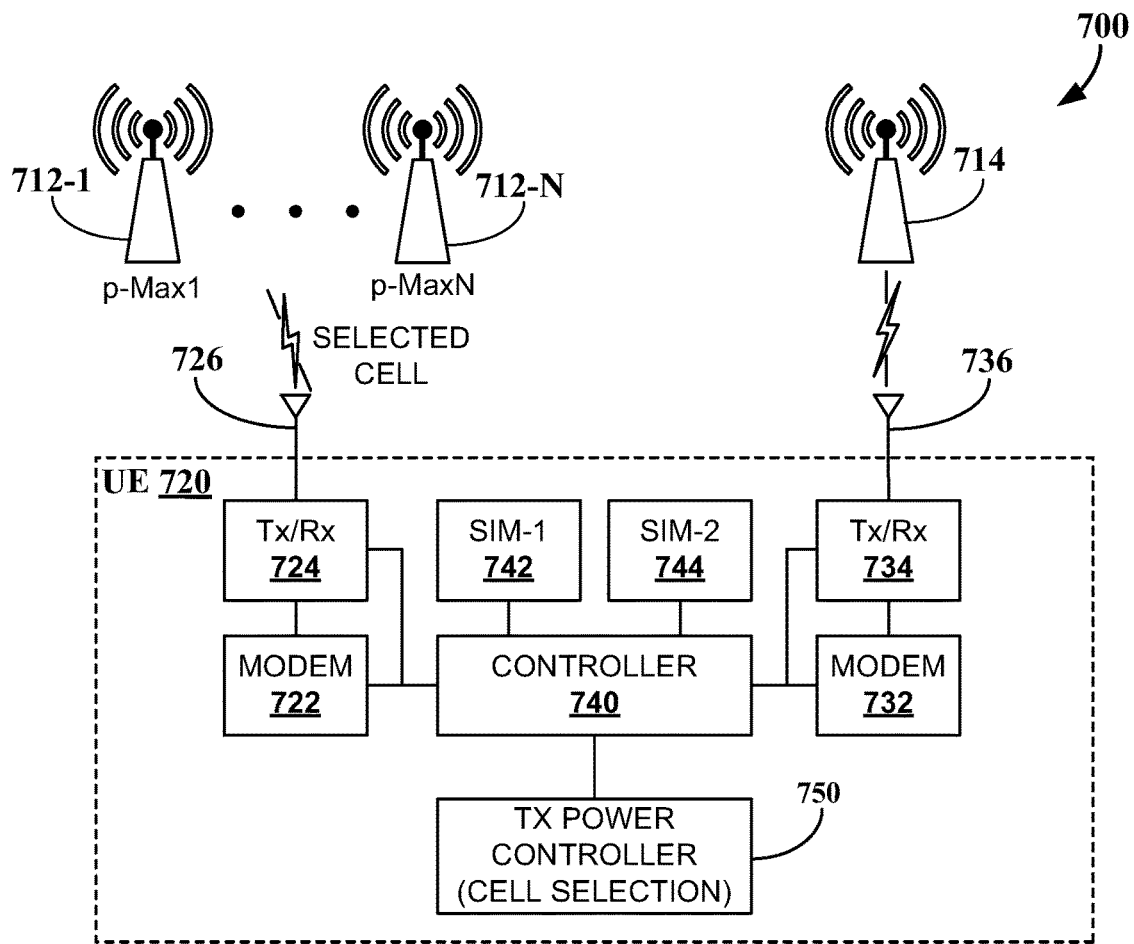
FIG. 7A is a diagram illustrating another example wireless communication system in accordance with another aspect of the disclosure.

FIG. 7A is a diagram illustrating another example wireless communication system 700 in accordance with another aspect of the disclosure. The wireless communication system 700 includes a set of available base stations or cells 712-1 to 712-N, another base station 714, and a user equipment (UE) 720. The UE 700 is configured to operate in MSIM and DSDA modes of operations, similar to UEs 420, 460, and 620 previously discussed.

More specifically, the UE 720 includes a first modem 722, a first transceiver (Tx/Rx) 724, a first antenna 726, a first SIM-1 card 742 (with reader), a controller 740, a second SIM-2 card (with reader or accessible via Bluetooth communications), a second modem 732, a second transceiver 734, and a second antenna 736. To reduce the occurrence, likelihood, or frequency of future simultaneous first and second signal transmissions by the first and second transceivers 724 and 734 exceeding the maximum allowed transmit power in DSDA mode of operation, the UE 720 further includes a transmit power controller 750 configured to effectuate cell selection. The transmit power controller 750 may effectuate cell selection in idle mode to one or both SIM card operations before commencing DSDA mode of operation, or in connected mode with regard to both SIM card operations.

In this example, the set of available cells 712-1 to 712-N meet the s-criteria for the UE 720. Accordingly, any of the cells 712-1 to 712-N are available to camp on by the UE 720. Each of the cells 712-1 to 712-N transmits various system information blocks (SIBs), such as SIB1, SIB3, SIB5, and SIB6. In idle mode, the UE 720 may monitor SIB1 and SIB3, and in connected mode, the UE 720 may monitor SIB5 and SIB6. Each of these SIBs have a parameter p-Max that specifies the maximum power that the UE 720 is to transmit to the cell transmitting the corresponding SIB.

Thus, if the transmit power controller 750 anticipates that the UE 720 will operate in DSDA mode while the UE 720 is in idle mode (e.g., it receives instruction from a user to operate in DSDA mode), the transmit power controller 750 obtains the p-Max information from SIB1 and/or SIB3 from each one of the set of available cells 712-1 to 712-N, and performs a cell selection based on a minimum or lower p-Max value among the p-Max values of one or more of the unselected cells 712-1 to 712-N, respectively. As an example, if a first subset of one or more of the set of available cells 712-1 to 712-N has a p-Max value of 23 dBm or higher, and a second subset of one or more of the set of available cells 712-1 to 712-N has a p-Max value of 20 dBm or lower, the transmit power controller 750 instructs the controller 740 to select one of the cells of the second subset.

The aforementioned cell selection operation also applies in connected mode. That is, the UE 720 may be currently camped on one of the set of available cells 712-1 to 712-N that has a p-Max value of 23 dBm or higher. If the transmit power controller 750 anticipates that the UE 720 will subsequently operate in DSDA mode, the transmit power controller 750 obtains the p-Max information from SIB5 and/or SIB6 from each one of the set of available cells 712-1 to 712-N, and performs a cell selection based on a minimum or lower p-Max value among the p-Max values of the set of available cells 712-1 to 712-N. Thus, if one or more of the set of available cells 712-1 to 712-N has a p-Max value of 20 dbm (lower than the p-Max of the cell it is currently camped), the transmit power controller 750 instructs the controller 740 to select a new cell with the lower p-Max on which to camp.

It shall be understood that one or more of the p-Max values associated with one or more of the set of available cells 712-1 to 712-N in which the UE 720 has previously obtained the information or camped on may be stored in an internal memory, allowing the UE 720 to access the one or more p-Max values from the internal memory instead of consuming power by receiving and decoding the corresponding SIBs.

As an example, if the UE 720 is designated as a power class 3 device, meaning that it has a maximum allowed transmit power of 23 dbm, the transmit power controller 750 may cause the UE 720 to camp on one of the set of available cells 712-1 to 712-N that has a p-Max of 20 dBm. Thus, because the maximum transmit power of the first transceiver 724 is limited to 20 dBm, the second transceiver 734 is able to transmit uplink signals at power levels up to 20 dBm in DSDA mode of operation. That is, simultaneous uplink signal transmissions by the first and second transceivers 724 and 734 at power levels of 20 dBm does not exceed the maximum allowed transmit power of 23 dBm for a power class 3 device. Thus, by appropriate cell selection, the first and second transceivers 724 and 734 may simultaneously transmit uplink signals with sufficient power for successful DSDA mode of operation.

Figure 7B:
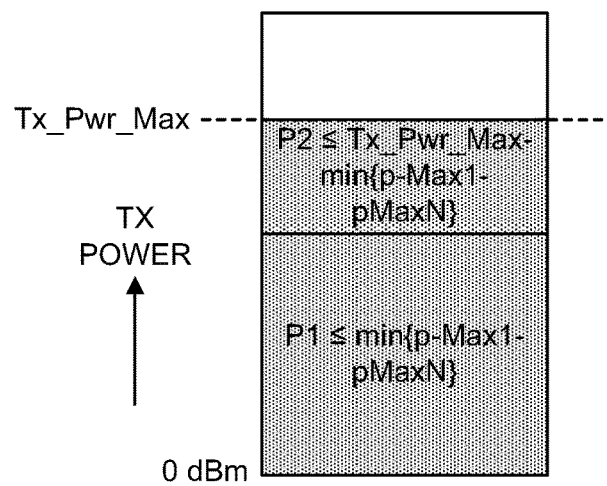
FIG. 7B is a transmission power level diagram pertaining to an example dual subscription dual active (DSDA) mode of operation of the UE of FIG. 7A in accordance with another aspect of the disclosure.

FIG. 7B is a transmission power level diagram pertaining to another example dual subscription dual active (DSDA) mode of operation in accordance with another aspect of the disclosure. The power level diagram is similar to the power level diagrams previously discussed. In this example, the transmit power controller 750 has effectuated a cell selection for the first transceiver 724 of UE 720 that has the minimum p-Max value of the set of available cells 712-1 to 712-N. Thus, in DSDA mode of operation, the first transceiver 724 of UE 720 transmits uplink signals at P1≤min {p-Max1-pMaxN}, where p-Max1 to p-MaxN values correspond to the set of available cells 712-1 to 712-N, respectively. Thus, in order to comply with the maximum allowed transmit power Tx_Pwr_Max, the second transceiver 734 may transmit uplink signals in DSDA mode up to a power level P2≤Tx_Pwr_Max minus the min{p-Max1-pMaxN}.

Figure 7C:
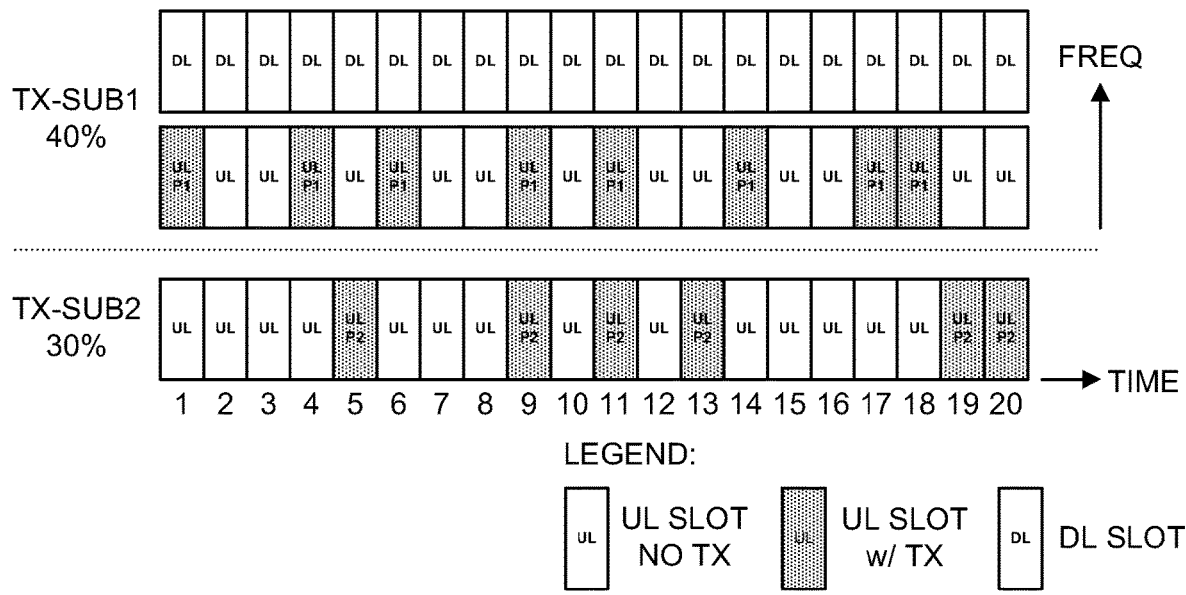
FIG. 7C is a timing diagram of an example frequency division duplex (FDD) slot configuration pertaining to a dual subscription dual active (DSDA) mode of operation of the UE of FIG. 7A in accordance with another aspect of the disclosure.

FIG. 7C is a timing diagram of an example frequency division duplex (FDD) slot configuration pertaining to a dual subscription dual active (DSDA) mode of operation in accordance with another aspect of the disclosure. In the previous example, the transmit power controller 750 selected a cell based on a minimum or lower p-Max value among a set of p-Max values pertaining to the set of available cells 712-1 to 712-N, respectively. In the examples associated with FIGS. 7C-7D, the transmit power controller 750 may select a cell that employs time division duplex (TDD) slot configuration as opposed to a FDD slot configuration. As explained below, this may reduce the likelihood or frequency of simultaneous uplink signal transmissions by transceivers 724 and 734 pursuant to a DSDA mode of operation to reduce power class conformance violations for the UE 720.

The x- or horizontal axis of the timing diagram of FIG. 7C represents time, which, in this example, is divided into 20 transmission slots numbered 1-20 (represented as rectangles). The upper portion of the timing diagram represents downlink (DL) time slots 1-20 substantially time aligned with uplink (UL) time slots 1-20 associated with the first transceiver 724 of UE 720, respectively. The vertical axis associated with the upper portion represents frequency. Thus, in the FDD slot configuration, the first transceiver 724 is able to receive downlink signals via a frequency carrier different than the frequency carrier in which the first transceiver 724 is able to transmit uplink signals. Thus, in FDD slot configuration, the first transceiver 724 is able to simultaneously receive downlink signals and transmit uplink signals.

In this example, the darkened rectangles represent slots in which the first transceiver 724 has transmitted uplink signals, such as slots 1, 4, 6, 9, 11, 14, 17 and 18, with a power level of P1 Similar to the example of FIG. 5A, the transmission rate is 40% as there are eight (8) uplink slot transmissions within a time interval of 20 slots. The lower portion of the timing diagram represents the uplink transmission slots of the second transceiver 734. In this example, second transceiver 734 has transmitted uplink signals in slots 5, 9, 11, 13, 19, and 20 at a power level of P2. Similar to the example of FIG. 5A, the transmission rate is 30% as there are six (6) uplink slot transmission within a time interval of 20 slots. Similarly, in slots 9 and 11, both the first and second transceivers 724 and 734 transmit signals simultaneously, which may result in a power class conformance violation if the sum of the power levels P1 and P2 exceeds the maximum allowed transmit power.

Figure 7D:
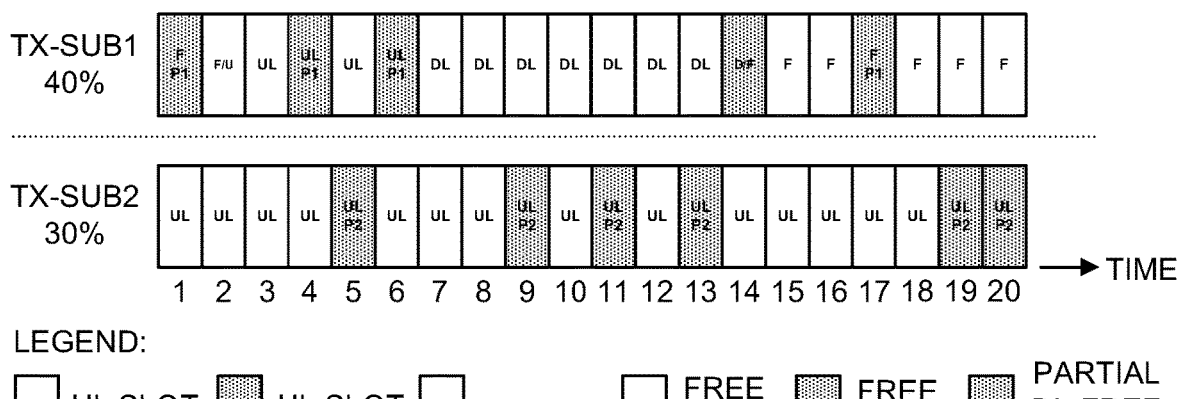
FIG. 7D is a timing diagram of an example time division duplex (TDD) slot configuration pertaining to a dual subscription dual active (DSDA) mode of operation of the UE of FIG. 7A in accordance with another aspect of the disclosure.

FIG. 7D is a timing diagram of an example time division duplex (TDD) slot configuration pertaining to a dual subscription dual active (DSDA) mode of operation in accordance with another aspect of the disclosure. Similarly, the x- or horizontal axis represents time, which, in this example, is divided into 20 transmission slots numbered 1-20 (represented as rectangles). The upper portion of the timing diagram represents TDD slots associated with the first transceiver 724, and the lower portion of the timing diagram represents UL FDD slots associated with the second transceiver 734.

In TDD slot configuration, the second transceiver 724 receives downlink signals and transmits uplink signals using the same frequency carrier. Thus, the reception of downlink signals is orthogonal to or non-overlapping with the transmission of uplink signals. In TDD slot configuration, there may be a section of consecutive uplink (UL) time slots, a section of consecutive downlink (DL) time slots, a section of consecutive free (F) time slots, which can be used for either downlink reception or uplink transmission, one or more time slots which are partially designated for downlink and free (D/F), and other one or more time slots which are partially designated for free and uplink (F/U).

In the example of FIG. 7D, the first transceiver 724 transmitted uplink signals in five (5) slots, namely slots 1, 4, 6, 14, and 17. As there are seven (7) downlink slots, the first transceiver 724 can only transmit uplink signals in 13 slots. As the first transceiver 724 transmitted uplink signals in five (5) slots, the transmission rate is still around 40% (e.g., 5/13×100%=38%). The second transceiver 734 transmitted uplink signals at a 30% transmission rate in slots 5, 9, 11, 13, 19, and 20. Due to the transmit power controller 750 effectuating a cell section to a TDD cell from an FDD cell, there is less likelihood or frequency of the first and second transceivers 724 and 734 transmitting uplink signals simultaneously. In this example, the first and second transceivers 724 and 734 do not transmit uplink signals simultaneously. Thus, the specified power levels P1 and P2 may remain the same with less likelihood or frequency of power class conformance violations by the UE 720.

Figure 8A:
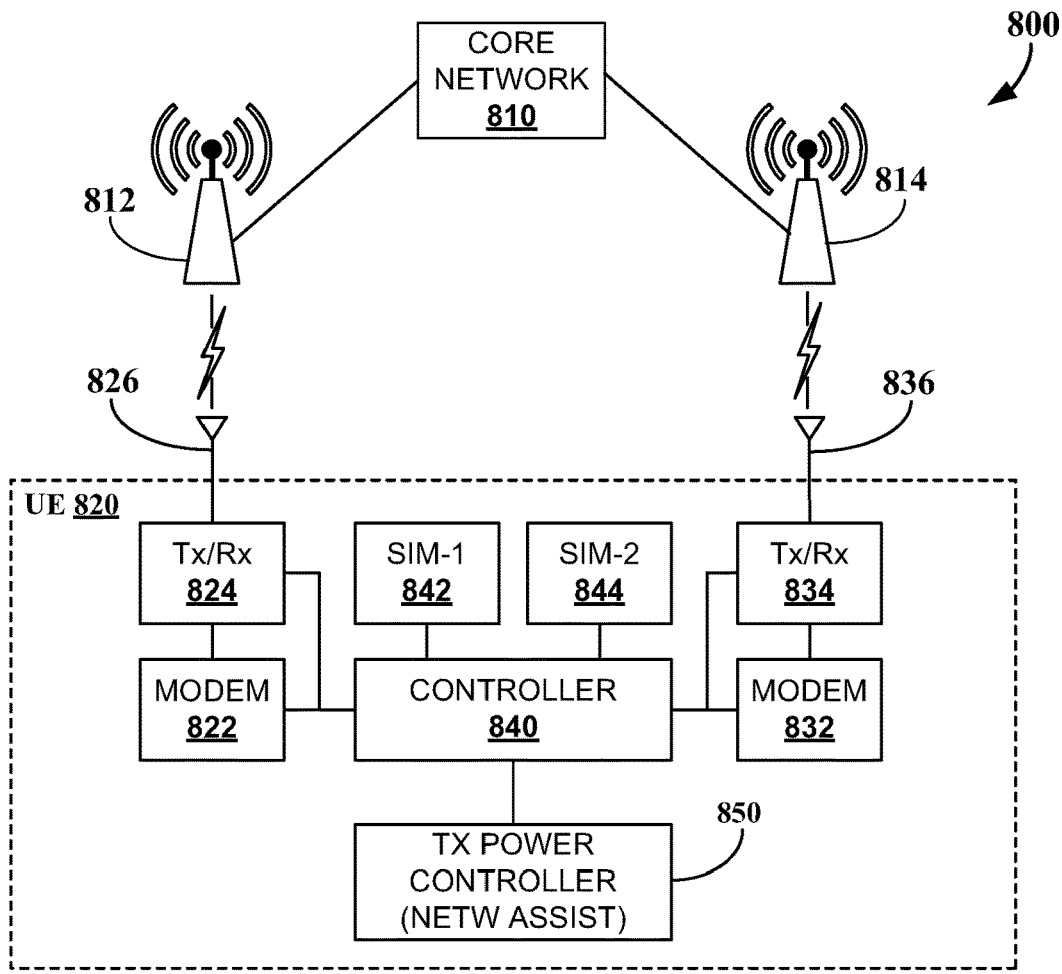
FIG. 8A is a diagram illustrating another example wireless communication system in accordance with another aspect of the disclosure.

FIG. 8A is a diagram illustrating another example wireless communication system 800 in accordance with another aspect of the disclosure. The wireless communication system 800 includes a first base station 812, a second base station 814, a core network 810, and a user equipment (UE) 820. The UE 800 is configured to operate in MSIM and DSDA modes of operations, similar to UEs 420, 460, 620, and 720 previously discussed.

More specifically, the UE 820 includes a first modem 822, a first transceiver (Tx/Rx) 824, a first antenna 826, a first SIM-1 card 842 (with reader), a controller 840, a second SIM-2 card (with reader or accessible via a Bluetooth transceiver), a second modem 832, a second transceiver 834, and a second antenna 836. To reduce the occurrence, likelihood, or frequency of future simultaneous first and second signal transmissions by the first and second transceivers 824 and 834 exceeding the maximum allowed transmit power in the DSDA mode of operation, the UE 820 further includes a transmit power controller 850 configured to request network assistance.

The transmit power controller 850 may ask assistance of the network including one or more of the base stations 812, 814, and/or core network 810 in reducing the occurrence, likelihood, or frequency of future simultaneous first and second signal transmissions by the first and second transceivers 824 and 834 exceeding the maximum allowed transmit power in the DSDA mode of operation. As discussed further herein, the assistance may take the form of reducing the transmission rate of the uplink signal transmissions by one or both of the first and second transceivers 824 and 834; rescheduling the uplink signal transmissions by one or both of the first and second transceivers 824 and 834; and instructing the UE 850 to not operate in DSDA mode, but instead operate in single UL operations mode.

Figure 8B:
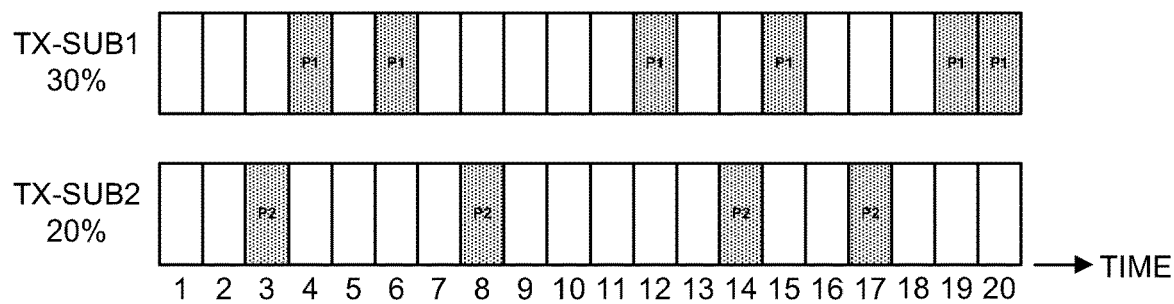
FIG. 8B is a timing diagram of an example uplink transmission slots pertaining to a dual subscription dual active (DSDA) mode of operation of the UE of FIG. 8A in accordance with another aspect of the disclosure.

FIG. 8B is a timing diagram of another example uplink transmission slots pertaining to a dual subscription dual active (DSDA) mode of operation in accordance with another aspect of the disclosure. Similar to the previously discussed timing diagrams, the x- or horizontal axis represents time divided up into 20 uplink transmission slots numbered 1-20, visually represented as rectangles. The upper portion of the timing diagram represents the uplink signal transmission slots associated with the first transceiver 824, and the lower portion of the timing diagram represents the uplink signal transmission slots associated with the second transceiver 834. The darkened rectangles represent slots that include uplink signal transmissions with a specified power level P1 for the first transceiver 824 and a specified power level P2 for the second transceiver 834.

In this example, the transmit power controller 850, to reduce the occurrence, likelihood, or frequency of future simultaneous first and second signal transmissions by the first and second transceivers 824 and 834 exceeding the maximum allowed transmit power in the DSDA mode of operation, causes one or more messages to be sent to the network for assistance in reducing the occurrence, likelihood or frequency of power class conformance violations. In response, the network sends one or more messages to the UE 820 instructing it to reduce the transmission rates associated with the first and second transceivers 824 and 834 from 40% and 30% as depicted in FIG. 5A to 30% and 20%, respectively. As there are less uplink signal transmissions within the 20-slot time interval, there is less likelihood or frequency of simultaneously uplink signal transmissions by the first and second transceivers 824 and 834. For instance, in the example of FIG. 5A, there were two slots 9 and 11 in which simultaneous uplink signal transmissions occurred. Whereas, in the example of FIG. 8B, there are none due to the reduction of the transmission rates associated with the first and second transceivers 824 and 834.

Figure 8C:
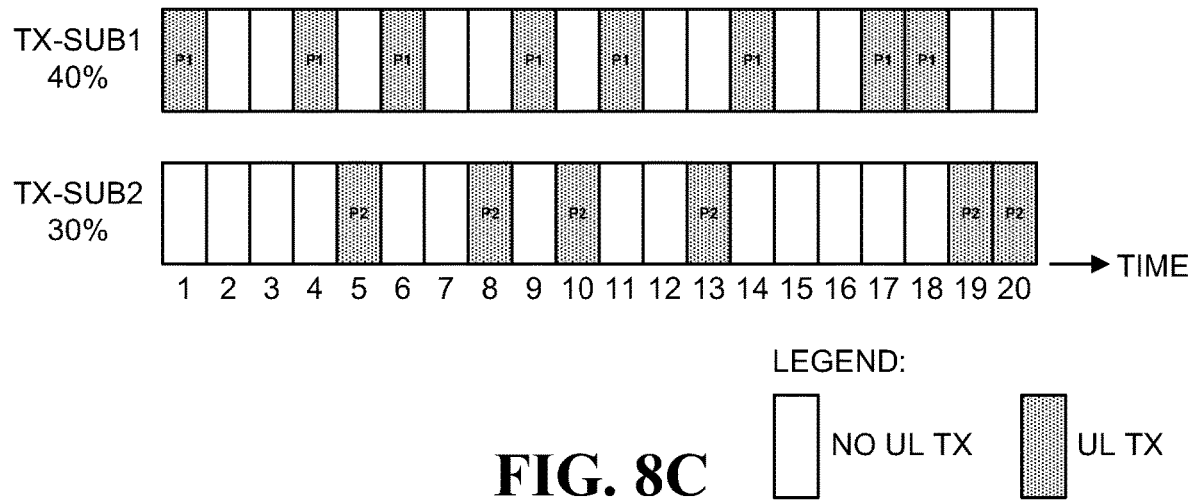
FIG. 8C is a timing diagram of another example uplink transmission slots pertaining to a dual subscription dual active (DSDA) mode of operation of the UE of FIG. 8A in accordance with another aspect of the disclosure.

FIG. 8C is a timing diagram of another example uplink transmission slots pertaining to a dual subscription dual active (DSDA) mode of operation in accordance with another aspect of the disclosure. Similar to the previously discussed timing diagrams, the x- or horizontal axis represents time divided up into 20 uplink transmission slots numbered 1-20, visually represented as rectangles. The upper portion of the timing diagram represents the uplink signal transmission slots associated with the first transceiver 824, and the lower portion of the timing diagram represents the uplink signal transmission slots associated with the second transceiver 834. The darkened rectangles represent slots that include uplink signal transmissions with a specified power level P1 for the first transceiver 824 and a specified power level P2 for the second transceiver 834.

In this example, the transmit power controller 850, to reduce the occurrence, likelihood, or frequency of future simultaneous first and second signal transmissions by the first and second transceivers 824 and 834 exceeding the maximum allowed transmit power in the DSDA mode of operation, causes one or more messages to be sent to the network for assistance in reducing the occurrence, likelihood or frequency of power class conformance violations. The message includes information, such as a bit map, identifying slots in which future simultaneous uplink transmissions by the first and second transceivers 824 and 834 are scheduled. Taking the example of FIG. 5A, the message indicates that simultaneous uplink signal transmissions are scheduled in slots 9 and 11.

In response to the network assistance request message, the network sends one or more messages to the UE 820 instructing it to reschedule the uplink signal transmissions in slots 9 and 11. In this example, the message reschedules uplink signal transmissions for the second transceiver 834 from slots 9 and 11 (FIG. 5A) to slots 8 and 10 (FIG. 8C), respectively. Thus, as illustrated in the timing diagram of FIG. 8C, the rescheduling of the uplink signal transmissions for the second transceiver 834 results in no simultaneous uplink signal transmission by the first and second transceivers 824 and 834; thereby, avoiding a potential power class conformance violation due to simultaneous uplink signal transmissions whose cumulative power exceeds the maximum allowed transmit power for the UE 820.

Figure 8D:
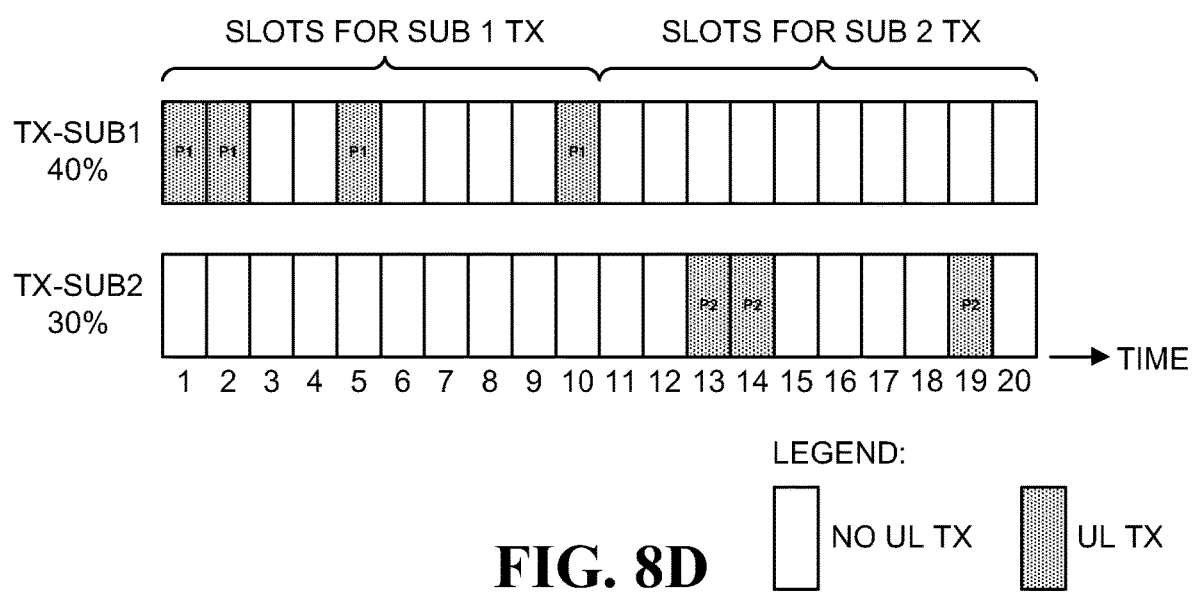
FIG. 8D is a timing diagram of another example uplink transmission slots pertaining to a dual subscription dual active (DSDA) mode of operation of the UE of FIG. 8A in accordance with another aspect of the disclosure.

FIG. 8D is a timing diagram of another example uplink transmission slots pertaining to a dual subscription dual active (DSDA) mode of operation in accordance with another aspect of the disclosure. Similar to the previously discussed timing diagrams, the x- or horizontal axis represents time divided up into 20 uplink transmission slots numbered 1-20, visually represented as rectangles. The upper portion of the timing diagram represents the uplink signal transmission slots associated with the first transceiver 824, and the lower portion of the timing diagram represents the uplink signal transmission slots associated with the second transceiver 834. The darkened rectangles represent slots that include uplink signal transmissions with a specified power level P1 for the first transceiver 824 and a specified power level P2 for the second transceiver 834.

In this example, the transmit power controller 850, to reduce the occurrence, likelihood, or frequency of future simultaneous first and second signal transmissions by the first and second transceivers 824 and 834 exceeding the maximum allowed transmit power in the DSDA mode of operation, updates the capability of the UE 820 to indicate single UL operation, and not DSDA mode of operation, and transmits a tracking area update (TAU) message to the network indicating the TAU update. In response, the network sends a response message to the UE 820 to schedule uplink signal transmissions for the first and second transceivers 824 and 834 during non-overlapping or orthogonal time intervals.

In this example, the network schedules uplink signal transmissions for the first transceiver 824 during slots 1-10, and for the second transceiver 834 during slots 11-20. Thus, with a transmission rate of 40%, the first transceiver 824 transmits uplink signals in slots 1, 2, 5 and 10; and with a transmission rate of 30%, the second transceiver 834 transmits uplink signals in slots 13, 14, and 19. As the uplink transmission intervals for the first and second transceivers 824 and 834 are non-overlapping or orthogonal, there are no simultaneous uplink signal transmissions by the first and second transceivers 824 and 834; thereby, avoiding a power class conformance violation due to simultaneous uplink signal transmissions whose cumulative power exceeds the maximum allowed transmit power for the UE 820.

Figure 9:
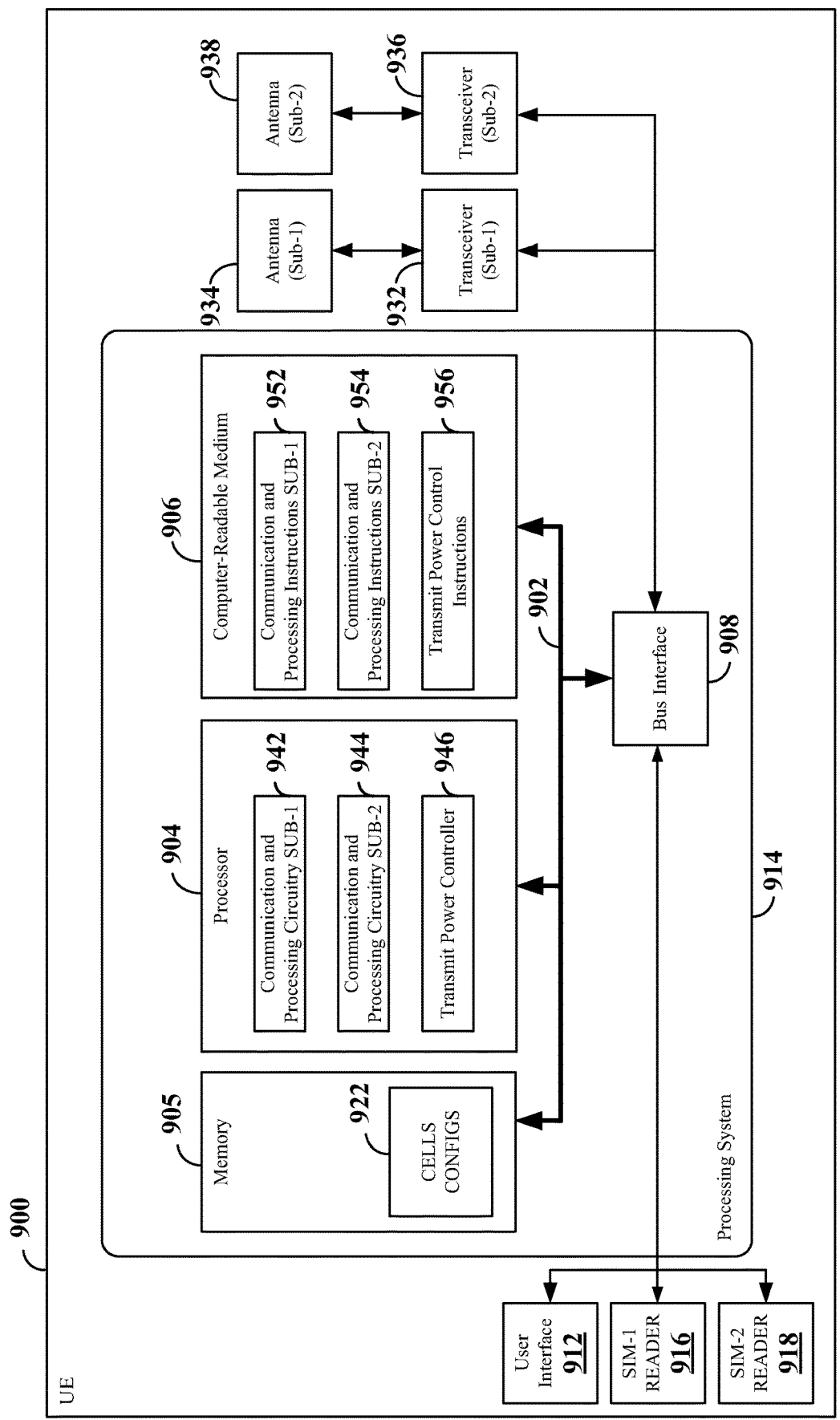
FIG. 9 is a block diagram illustrating an example of a hardware implementation for user equipment (UE) employing a processing system in accordance with another aspect of the disclosure.

FIG. 9 is a block diagram illustrating an example of a hardware implementation for a user equipment (UE) 900 employing a processing system 914. For example, the UE 900 may correspond to any of the UEs described above with reference to FIGS. 1, 2, 4A-4B, 6A, 7A and 8A.

The UE 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in the UE 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 links together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further.

A bus interface 908 provides an interface between the bus 902 and a first transceiver 932 coupled to at least one antenna 934 (e.g., an antenna array or one or more antenna panels) associated with a first SIM-1 card. The bus interface 908 also provides an interface between the bus 902 and a second transceiver 936 coupled to another at least one antenna 938 (e.g., an antenna array or one or more antenna panels) associated with a second SIM-2 card. The transceivers 932 and 936 provide a means for communicating with various other apparatus over a transmission medium (e.g., air interface). Depending upon the nature of the apparatus, a user interface 912 (e.g., keypad, display, touch screen, speaker, microphone, control knobs, etc.) may also be coupled to the bus interface 908. Of course, such a user interface 912 is optional, and may be omitted in some examples. Additionally, the UE 900 may include SIM card readers, such as SIM-1 reader 916 for reading information from a first SIM-1 card and SIM-2 reader 918 for reading information from a second SIM-2 card, both coupled to the bus interface 908.

The processor 904 is responsible for managing the bus 902 and general processing, including the execution of software stored on the computer-readable medium 906. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store cell configuration information, such as information received via SIBs (e.g., SIB1, SIB3, SIB5, and/or SIB6), from cells previously camped on or previously obtained the SIB information including the p-Max parameters.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. In some examples, the computer-readable medium 906 may be part of the memory 905. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include a communication and processing circuitry SUB-1 942 configured to communicate with a first base station, such as a gNB, in MSIM and/or DSDA modes of operation in accordance with information in a first SIM-1 card read by the first SIM-1 card reader 916. The communication and processing circuitry SUB-1 942 may perform its operations under the control of communication and processing instructions SUB-1 952 stored in the computer-readable medium 906. In some examples, the communication and processing circuitry SUB-1 942 may include one or more hardware components that provide the physical structure that performs processes related to wireless communication (e.g., signal reception and/or signal transmission) and signal processing (e.g., processing a received signal and/or processing a signal for transmission).

The processor 904 may include a communication and processing circuitry 944, configured to communicate with a second base station, such as a gNB, in MSIM and/or DSDA modes of operation in accordance with information in a second SIM-2 card read by the second SIM-2 card reader 918. The communication and processing circuitry SUB-2 944 may perform its operations under the control of communication and processing instructions SUB-2 954 stored in the computer-readable medium 906. In some examples, the communication and processing circuitry SUB-2 944 may include one or more hardware components that provide the physical structure that performs processes related to wireless communication (e.g., signal reception and/or signal transmission) and signal processing (e.g., processing a received signal and/or processing a signal for transmission).

The processor 904 may include a transmit power controller 946 to control the signal transmission powers of the transceivers 932 and 936 in MSIM and/or DSDA modes of operation, as previously discussed with reference to transmit power controllers 650, 750, and 850. Accordingly, the transmit power controller 946 may be configured to adjusts the transmit power of one or both the transceivers 932 and 936 so that the sum of the transmit power levels of signals simultaneously transmitted by the transceivers 932 and 936 pursuant to DSDA mode of operation does not exceed the maximum allowed transmit power. As previously discussed, the adjustment may be based on the priority of the applications to which the transmitted signals pertain (e.g., priority levels: emergency>C-V2X>Voice>Data, or Vehicle SIM>Occupant user device SIM).

The transmit power controller 946 may be configured to effectuate cell selection to reduce the occurrence, likelihood or frequency of the sum of the transmit power levels of signals simultaneously transmitted by the transceivers 932 and 936 pursuant to DSDA mode of operation exceeding the maximum allowed transmit power. As previously discussed, the transmit power controller 946 may perform this by selecting a cell with a p-Max value being the minimum or a lower one among a set of p-Max values associated with a set of available cells on which to camp. The transmit power controller 946 may also perform this by selecting a cell that uses a TDD slot configuration instead of a FDD slot configuration.

The transmit power controller 946 may be configured to request network assistance to reduce the occurrence, likelihood or frequency of the sum of the transmit power levels of signals simultaneously transmitted by the transceivers 932 and 936 pursuant to DSDA mode of operation exceeding the maximum allowed transmit power. As previously discussed, the transmit power controller 946 may send a first message to the network that it has violated or anticipates violating the power class conformance of the UE 900, and in response to the first message, the network sends a second message to the UE 900 instructing it to reduce the transmission rate associated with one or both of the transceivers 932 and 936.

The transmit power controller 946 may also send a first message to the network indicating a current uplink signal transmission schedule that identifies one or more slots where the transceivers 932 and 936 are simultaneously transmitting uplink signals, and the network responds by sending a second message to the UE 900 to effectuate a reschedule of the uplink signal transmissions to eliminate or reduce the number of slots where both transceivers 932 and 936 are simultaneously transmitting. The transmit power controller 946 may also send a first message to the network indicating a potential power class violation, and the network responds by sending a second message to the UE 900 to cease operating in DSDA mode, and operate under single UL operation mode. The transmit power controller 946 may perform the aforementioned operations under the control of transmit power control instructions 956 stored in the computer-readable medium 906.

Figure 10:
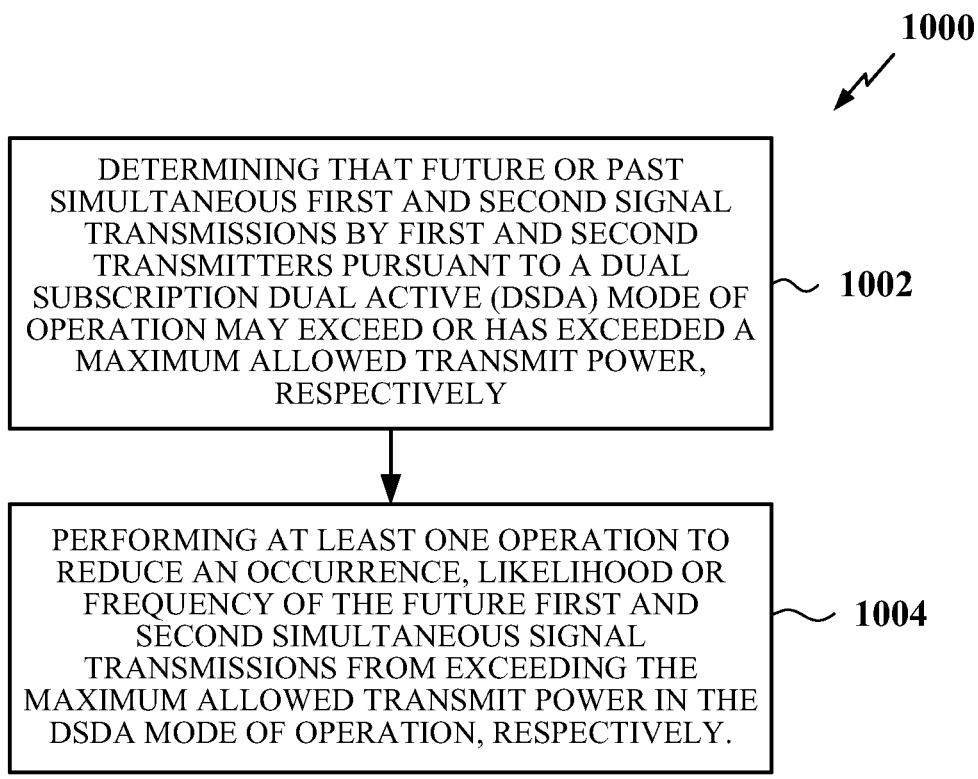
FIG. 10 is a flow charts illustrating an exemplary method of transmission power control pertaining to a dual subscription dual active (DSDA) mode of operation in accordance with another aspect of the disclosure.

FIG. 10 is a flow charts illustrating an exemplary method 1000 of transmission power control pertaining to a dual subscription dual active (DSDA) mode of operation in accordance with other aspects of the disclosure. According to the method 1000, the transmit power controller 946, under the control of the transmit power control instructions 956 stored in the computer-readable medium 906, determines that future or past simultaneous first and second signal transmissions by first and second transceivers 932 and 936 pursuant to a dual subscription dual active (DSDA) mode of operation may exceed or has exceeded a maximum allowed transmit power, respectively (block 1002). Further, according to the method 1000, the transmit power controller 946, under the control of the transmit power control instructions 956 stored in the computer-readable medium 906, performs at least one operation to reduce an occurrence, likelihood or frequency of the future simultaneous first and second signal transmissions exceeding the maximum allowed transmit power in the DSDA mode of operation, respectively (block 1004).

In one configuration, the UE 1000 includes various means as described in the present disclosure. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable medium 1006, or any other suitable apparatus or means described in any one of the FIGS. 1, 2, 4A-4B, 6A, 7A and 8A, and utilizing, for example, the processes and/or algorithms described herein in relation to FIG. 9.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4A-4B, 6A, 7A, 8A, and 9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The following provides an overview of aspects of the present disclosure:

Aspect 1: A method of wireless communication at a user equipment (UE), including: determining that future or past simultaneous first and second signal transmissions by first and second transceivers pursuant to a dual subscription dual active (DSDA) mode of operation may exceed or has exceeded a maximum allowed transmit power, respectively; and performing at least one operation to reduce an occurrence, likelihood or frequency of the future simultaneous first and second signal transmissions exceeding the maximum allowed transmit power in the DSDA mode of operation, respectively.

Aspect 2: The method of aspect 1, wherein performing the at least one operation includes setting first and second transmit power levels for the future simultaneous first and second signal transmissions by the first and second transceivers in the DSDA mode of operation, respectively, wherein a sum of the first and second transmit power levels does not exceed the maximum allowed transmit power.

Aspect 3: The method of aspect 2, wherein the first transmit power level is higher than the second transmit power level.

Aspect 4: The method of aspect 2, wherein the first transmit power level is higher than the second transmit power level due to the future first signal transmission having a higher priority than the future second signal transmission.

Aspect 5: The method of any one of aspects 2-4, wherein the first transmit power level corresponds to a specified power level for the future first signal transmission, and wherein the second transmit power level is related to the maximum allowed transmit power minus the specified power level.

Aspect 6: The method of any one of aspects 1-5, wherein the future first signal transmission relates to an emergency signal transmission.

Aspect 7: The method of any one of aspects 1-6, wherein the future first signal transmission relates to a cellular-vehicle signal transmission, and the future second signal transmission relates to a vehicle occupant user device signal transmission.

Aspect 8: The method of any one of aspects 1-7, wherein the future first signal transmission relates to a cellular-vehicle operation signal transmission, and the future second signal transmission relates to a data or voice signal transmission.

Aspect 9: The method of any one of aspects 1-8, wherein the at least one operation includes selecting a cell among a set of available cells.

Aspect 10: The method of aspect 9, wherein selecting the cell is based on the cell specifying a first maximum transmit power level for the future first signal transmission less than one or more other maximum transmit power levels specified by the unselected one or more cells of the set, respectively.

Aspect 11: The method of aspect 10, wherein the at least one operation further includes specifying a second maximum transmit power level for the future second signal transmission related to the maximum allowed transmit power minus the first maximum transmit power level.

Aspect 12: The method of any one of aspect 9-11, wherein the selected cell employs time division duplex (TDD) uplink and downlink signal transmissions, and wherein one or more other of the set of available cells employ frequency division duplex (FDD) uplink and downlink signal transmissions.

Aspect 13: The method of any one of aspects 9-12, wherein selecting the cell among the set of available cells is performed in either connected or idle mode.

Aspect 14: The method of any one of aspect 1-13, wherein the at least one operation includes sending a first message to a network to assist in reducing the occurrence, likelihood or frequency of the future simultaneous first and second signal transmissions exceeding the maximum allowed transmit power in the DSDA mode of operation, respectively.

Aspect 15: The method of aspect 14, wherein the at least one operation further includes receiving a second message from the network in response to the first message, the second message providing instruction to reduce a transmission rate associated with future signal transmissions by the first and/or second transceivers, respectively.

Aspect 16: The method of aspect 14 or 15, wherein the first message identifies one or more time intervals of scheduled future first and second simultaneous signal transmissions, and wherein the at least one operation further includes receiving a second message from the network in response to the first message to reschedule the first and second signal transmissions by the first and second transceivers, respectively.

Aspect 17: The method of aspect 14, wherein the at least one operation further includes receiving a second message from the network in response to the first message, the second message providing instruction to operate in single uplink (UL) operations mode.

Aspect 18: The method of any one of aspects 1-17, wherein the maximum allowed transmit power is related to a power class of the UE.

Aspect 19: A user equipment (UE) within a wireless communication network, comprising: a first transceiver; a second transceiver; a memory; and a processor communicatively coupled to the first and second transceivers and the memory, wherein the processor and the memory are configured to: determine that future or past simultaneous first and second signal transmissions by the first and second transceivers pursuant to a dual subscription dual active (DSDA) mode of operation may exceed or has exceeded a maximum allowed transmit power, respectively; and perform at least one operation to reduce an occurrence, likelihood or frequency of the future simultaneous first and second signal transmissions exceeding the maximum allowed transmit power in the DSDA mode of operation, respectively.

Aspect 20: The UE of aspect 19, wherein the at least one operation includes setting first and second transmit power levels for the future simultaneous first and second signal transmissions by the first and second transceivers in the DSDA mode of operation, respectively, wherein a sum of the first and second transmit power levels does not exceed the maximum allowed transmit power.

Aspect 21: The UE of aspect 20, wherein the first transmit power level is higher than the second transmit power level due to the future first signal transmission having a higher priority than the future second signal transmission.

Aspect 22: The UE of any one of aspects 19-21, wherein the at least one operation includes selecting a cell among a set of available cells.

Aspect 23: The UE of aspect 22, wherein selecting the cell is based on the cell specifying a first maximum transmit power level for the future first signal transmission less than one or more other maximum transmit power levels specified by the unselected one or more cells of the set, respectively.

Aspect 24: The UE of aspect 22 or 23, wherein the selected cell employs time division duplex (TDD) uplink and downlink signal transmissions, and wherein one or more other of the set of available cells employ frequency division duplex (FDD) uplink and downlink signal transmissions.

Aspect 25: The UE of any one of aspects 22-24, wherein selecting the cell among the set of available cells is performed in either connected or idle mode.

Aspect 26: The UE of any one of aspects 19-25, wherein the at least one operation includes sending a first message to a network to assist in reducing the occurrence, likelihood or frequency of the future simultaneous first and second signal transmissions exceeding the maximum allowed transmit power in the DSDA mode of operation, respectively.

Aspect 27: The UE of aspect 26, wherein the at least one operation further includes receiving a second message from the network in response to the first message, the second message providing instruction to reduce a transmission rate associated with future signal transmissions by the first and/or second transceivers, respectively.

Aspect 28: The UE of aspect 26, wherein the first message identifies one or more time intervals of scheduled future first and second simultaneous signal transmissions, and wherein the at least one operation further includes receiving a second message from the network in response to the first message to change the scheduling of future signal transmissions by the first and second transceivers, respectively.

Aspect 29: The UE of aspect 26, wherein the at least one operation further includes receiving a second message from the network in response to the first message, the second message providing instruction to operate in single uplink (UL) operations mode.

Aspect 30: A user equipment (UE) within a wireless communication network, comprising: means for determining that future or past simultaneous first and second signal transmissions by first and second transceivers pursuant to a dual subscription dual active (DSDA) mode of operation may exceed or has exceeded a maximum allowed transmit power, respectively; and means for performing at least one operation to reduce an occurrence, likelihood or frequency of the future simultaneous first and second signal transmissions exceeding the maximum allowed transmit power in the DSDA mode of operation, respectively.

Aspect 31: A non-transitory computer-readable medium storing computer-executable code, comprising code for causing a computer in a user equipment (UE) to: determine that future or past simultaneous first and second signal transmissions by first and second transceivers pursuant to a dual subscription dual active (DSDA) mode of operation may exceed or has exceeded a maximum allowed transmit power, respectively; and perform at least one operation to reduce an occurrence, likelihood or frequency of the future simultaneous first and second signal transmissions exceeding the maximum allowed transmit power in the DSDA mode of operation, respectively.

What is claimed is:

1. A method of wireless communication at a user equipment (UE), comprising:
   determining that future or past simultaneous first and second signal transmissions by first and second transceivers pursuant to a dual subscription dual active (DSDA) mode of operation may exceed or has exceeded a maximum allowed transmit power, respectively; and
   performing at least one operation to reduce an occurrence, likelihood or frequency of the future simultaneous first and second signal transmissions exceeding the maximum allowed transmit power in the DSDA mode of operation, respectively, wherein the at least one operation comprises selecting a cell among a set of available cells, wherein selecting the cell is based on the cell specifying a first maximum transmit power level for the future first signal transmission less than one or more other maximum transmit power levels specified by the unselected one or more cells of the set, respectively.

2. The method of claim 1, wherein performing the at least one operation comprises setting first and second transmit power levels for the future simultaneous first and second signal transmissions by the first and second transceivers in the DSDA mode of operation, respectively, wherein a sum of the first and second transmit power levels does not exceed the maximum allowed transmit power.

3. The method of claim 2, wherein the first transmit power level is higher than the second transmit power level.

4. The method of claim 2, wherein the first transmit power level is higher than the second transmit power level due to the future first signal transmission having a higher priority than the future second signal transmission.

5. The method of claim 4, wherein the first transmit power level corresponds to a specified power level for the future first signal transmission, and wherein the second transmit power level is related to the maximum allowed transmit power minus the specified power level.

6. The method of claim 4, wherein the future first signal transmission relates to an emergency signal transmission.

7. The method of claim 4, wherein the future first signal transmission relates to a cellular-vehicle signal transmission, and the future second signal transmission relates to a vehicle occupant user device signal transmission.

8. The method of claim 4, wherein the future first signal transmission relates to a cellular-vehicle operation signal transmission, and the future second signal transmission relates to a data or voice signal transmission.

9. The method of claim 1, wherein the at least one operation further comprises specifying a second maximum transmit power level for the future second signal transmission related to the maximum allowed transmit power minus the first maximum transmit power level.

10. The method of claim 1, wherein the selected cell employs time division duplex (TDD) uplink and downlink signal transmissions, and wherein one or more other of the set of available cells employ frequency division duplex (FDD) uplink and downlink signal transmissions.

11. The method of claim 1, wherein selecting the cell among the set of available cells is performed in either connected or idle mode.

12. The method of claim 1, wherein the at least one operation comprises sending a first message to a network to assist in reducing the occurrence, likelihood or frequency of the future simultaneous first and second signal transmissions exceeding the maximum allowed transmit power in the DSDA mode of operation, respectively.

13. The method of claim 12, wherein the at least one operation further comprises receiving a second message from the network in response to the first message, the second message providing instruction to reduce a transmission rate associated with future signal transmissions by the first and/or second transceivers, respectively.

14. The method of claim 12, wherein the first message identifies one or more time intervals of scheduled future first and second simultaneous signal transmissions, and wherein the at least one operation further comprises receiving a second message from the network in response to the first message to reschedule the first and second signal transmissions by the first and second transceivers, respectively.

15. The method of claim 12, wherein the at least one operation further comprises receiving a second message from the network in response to the first message, the second message providing instruction to operate in single uplink (UL) operations mode.

16. The method of claim 1, wherein the maximum allowed transmit power is related to a power class of the UE.

17. A user equipment (UE) within a wireless communication network, comprising:
a first transceiver;
a second transceiver;
a memory; and
a processor communicatively coupled to the first and second transceivers and the memory, wherein the processor and the memory are configured to:
determine that future or past simultaneous first and second signal transmissions by the first and second transceivers pursuant to a dual subscription dual active (DSDA) mode of operation may exceed or has exceeded a maximum allowed transmit power, respectively; and
perform at least one operation to reduce an occurrence, likelihood or frequency of the future simultaneous first and second signal transmissions exceeding the maximum allowed transmit power in the DSDA mode of operation, respectively, wherein the at least one operation comprises selecting a cell among a set of available cells, wherein selecting the cell is based on the cell specifying a first maximum transmit power level for the future first signal transmission less than one or more other maximum transmit power levels specified by the unselected one or more cells of the set, respectively.

18. The UE of claim 17, wherein the at least one operation comprises setting first and second transmit power levels for the future simultaneous first and second signal transmissions by the first and second transceivers in the DSDA mode of operation, respectively, wherein a sum of the first and second transmit power levels does not exceed the maximum allowed transmit power.

19. The UE of claim 18, wherein the first transmit power level is higher than the second transmit power level due to the future first signal transmission having a higher priority than the future second signal transmission.

20. The UE of claim 17, wherein the selected cell employs time division duplex (TDD) uplink and downlink signal transmissions, and wherein one or more other of the set of available cells employ frequency division duplex (FDD) uplink and downlink signal transmissions.

21. The UE of claim 17, wherein the at least one operation comprises sending a first message to a network to assist in reducing the occurrence, likelihood or frequency of the future simultaneous first and second signal transmissions exceeding the maximum allowed transmit power in the DSDA mode of operation, respectively.

22. The UE of claim 21, wherein the at least one operation further comprises receiving a second message from the network in response to the first message, the second message providing instruction to reduce a transmission rate associated with future signal transmissions by the first and/or second transceivers, respectively.

23. The UE of claim 21, wherein the first message identifies one or more time intervals of scheduled future first and second simultaneous signal transmissions, and wherein the at least one operation further comprises receiving a second message from the network in response to the first message to change the scheduling of future signal transmissions by the first and second transceivers, respectively.

24. The UE of claim 21, wherein the at least one operation further comprises receiving a second message from the network in response to the first message, the second message providing instruction to operate in single uplink (UL) operations mode.

25. A user equipment (UE) within a wireless communication network, comprising:
means for determining that future or past simultaneous first and second signal transmissions by first and second transceivers pursuant to a dual subscription dual active (DSDA) mode of operation may exceed or has exceeded a maximum allowed transmit power, respectively; and
means for performing at least one operation to reduce an occurrence, likelihood or frequency of the future simultaneous first and second signal transmissions exceeding the maximum allowed transmit power in the DSDA mode of operation, respectively, wherein the means for performing the at least one operation comprises means for selecting a cell among a set of available cells, wherein the means for selecting the cell is based on the cell specifying a first maximum transmit power level for the future first signal transmission less than one or more other maximum transmit power levels specified by the unselected one or more cells of the set, respectively.

26. A non-transitory computer-readable medium storing computer-executable code, comprising code for causing a computer in a user equipment (UE) to:
determine that future or past simultaneous first and second signal transmissions by first and second transceivers pursuant to a dual subscription dual active (DSDA) mode of operation may exceed or has exceeded a maximum allowed transmit power, respectively; and
perform at least one operation to reduce an occurrence, likelihood or frequency of the future simultaneous first and second signal transmissions exceeding the maximum allowed transmit power in the DSDA mode of operation, respectively, wherein the at least one operation comprises selecting a cell among a set of available cells, wherein selecting the cell is based on the cell specifying a first maximum transmit power level for the future first signal transmission less than one or more other maximum transmit power levels specified by the unselected one or more cells of the set, respectively.

* * * * *